United States Patent
Williamson et al.

(10) Patent No.: US 7,900,020 B2
(45) Date of Patent: Mar. 1, 2011

(54) CORRECTION OF INCORRECT CACHE ACCESSES

(75) Inventors: Barry Duane Williamson, Austin, TX (US); Gerard Richard Williams, Austin, TX (US); Muralidharan Santharaman Chinnakonda, Austin, TX (US)

(73) Assignees: ARM Limited, Cambridge (GB); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/010,512

(22) Filed: Jan. 25, 2008

(65) Prior Publication Data
US 2008/0222387 A1    Sep. 11, 2008

Related U.S. Application Data

(63) Continuation of application No. 11/193,634, filed on Aug. 1, 2005, now abandoned, which is a continuation-in-part of application No. 11/105,593, filed on Apr. 14, 2005, now abandoned.

(51) Int. Cl.
*G06F 12/00* (2006.01)
(52) U.S. Cl. ............. 711/216; 711/3; 711/118; 711/128; 711/E12.001; 711/E12.018; 711/E12.06; 711/E12.063
(58) Field of Classification Search .................. None
See application file for complete search history.

(56) References Cited

U.S. PATENT DOCUMENTS

| | | | |
|---|---|---|---|
| 5,659,699 A | 8/1997 | Breternitz, Jr. | |
| 6,567,817 B1 | 5/2003 | VanLeer | |
| 6,754,662 B1 | 6/2004 | Li | |
| 6,848,029 B2 | 1/2005 | Coldewey | |
| 7,010,645 B2 | 3/2006 | Hetzler et al. | |

(Continued)

FOREIGN PATENT DOCUMENTS

JP    09034791 A  *  2/1997

OTHER PUBLICATIONS

Machine translation of JP 09034791 A to Atsushi Motohashi, Feb. 1997.*

*Primary Examiner* — Kevin Verbrugge
(74) *Attorney, Agent, or Firm* — Nixon & Vanderhye P.C.

(57) ABSTRACT

The application describes a data processor operable to process data, and comprising: a cache in which a storage location of a data item within said cache is identified by an address, said cache comprising a plurality of storage locations and said data processor comprising a cache directory operable to store a physical address indicator for each storage location comprising stored data; a hash value generator operable to generate a generated hash value from at least some of said bits of said address said generated hash value having fewer bits than said address; a buffer operable to store a plurality of hash values relating to said plurality of storage locations within said cache; wherein in response to a request to access said data item said data processor is operable to compare said generated hash value with at least some of said plurality of hash values stored within said buffer and in response to a match to indicate a indicated storage location of said data item; and said data processor is operable to access one of said physical address indicators stored within said cache directory corresponding to said indicated storage location and in response to said accessed physical address indicator not indicating said address said data processor is operable to invalidate said indicated storage location within said cache.

12 Claims, 11 Drawing Sheets

U.S. PATENT DOCUMENTS

| | | |
|---|---|---|
| 7,136,960 B2 | 11/2006 | Honig |
| 7,171,439 B2 | 1/2007 | Honig |
| 7,330,936 B2 * | 2/2008 | Tran et al. ............ 711/128 |
| 2003/0233515 A1 | 12/2003 | Honig |
| 2004/0128470 A1 | 7/2004 | Hetzler |
| 2004/0133747 A1 | 7/2004 | Coldewey |
| 2006/0047884 A1 | 3/2006 | Tran et al. |
| 2006/0047912 A1 | 3/2006 | Chinnakonda |
| 2006/0095654 A1 | 5/2006 | Miller et al. |
| 2006/0236074 A1 * | 10/2006 | Williamson et al. ........ 711/216 |

* cited by examiner

CORRECTION OF INCORRECT CACHE ACCESSES

This application is a Continuation of application Ser. No. 11/193,634, filed Aug. 1, 2005 now abandoned, which is a Continuation-in-Part of application Ser. No. 11/105,593, filed Apr. 14, 2005 now abandoned. The entire contents of these applications are incorporated herein by reference.

BACKGROUND OF THE INVENTION

1. Field of the Invention

This invention relates to the field of data processing systems. More particularly, this invention relates to the field of accessing data within a cache.

2. Description of the Prior Art

Caches within data processors can store large amounts of data. Accessing data within caches can be quite a complicated procedure requiring addresses of a relatively large size. Manipulation of such addresses can therefore require significant amounts of power and time. Caches have been organised in a number of ways in order to reduce power and time overheads involved in accessing storage locations within the caches.

One popular way of configuring a cache is the so-called 'set associative' cache. A 16 Kbyte set associative cache is shown in FIG. 1. The cache shown is such a 4-way set associative cache 10 having 4 ways 11, 12, 13, 14 each containing a number of cache lines 20. A data value (in the following examples, a word) associated with a particular address 35 can be stored in a particular cache line of any of the 4 ways (i.e. each set has 4 cache lines, as illustrated generally by reference numeral 22). Each way stores 4 Kbytes (16 Kbyte cache/4 ways). If each cache line stores eight 32-bit words then there are 32 bytes/cache line (8 words×4 bytes/word) and 128 cache lines in each way ((4 Kbytes/way)/(32 bytes/cache line)). Hence, in this illustrative example, the total number of sets would be equal to 128, i.e. 'M' in the figure would be 127.

In order to address data stored in this sort of a cache an address 35 comprising a SET or index portion 37, which indicates which of the sets or lines the address is referring to and a TAG portion 36 indicating which of the four ways it is in is used. Such an address identifies a cache line and a cache way. The line being identified by the set and a comparison and match of TAGs stored in 4 TAG RAMs 25 with the TAGs in the corresponding set of the 4 caches 10 indicating the way. In reality more than one data word may be stored in a cache line within a cache way and thus, the address may contain further information.

When accessing data stored in a cache organised in this way, any virtual address produced by a programming model will need to be converted to a physical address. This can slow the procedure, as the program will produce the virtual address early, but the data cannot be accessed until it is converted to a physical address.

A known way of converting a virtual address to a physical address is by the use of a translation lookaside buffer or TLB. FIG. 2 shows a known way of accessing data during which a virtual address is converted to a physical address, the physical address then being used to access the data. In this Figure a table lookaside buffer (TLB) 30, receives a virtual address from a programmer's model and converts it to a physical address. The physical address 35 comprises a tag portion 36 and an index portion 37. The index portion is used to indicate which set within the cache ways the address refers to. Thus, a corresponding line within the plurality of cache tag directories 40 is selected using the index portion of address 35. The tag portion 36 of address 35 is then compared in comparator 60 with the four tags stored in each of the four cache tag directories that correspond to the four ways of the cache. When a comparison gives a match this indicates the cache way storing the data item and this data item can then be accessed from cache 50 using multiplexer 70.

This is one way in which data identified by a virtual address can be accessed. The initial step in this procedure is conversion of the virtual address to a physical address using a table lookaside buffer. This is not a fast step and thus, having this as the first step in the procedure considerably slows the critical path. An alternative to this is shown in FIG. 3. This system is referred to as a virtually indexed/physically tagged cache system. In this example the data access is performed using the virtual index to select which set (or line) the tag will be stored in. Thus, as soon as the virtual address is available this step can be performed in parallel with the conversion of the virtual address to a physical address using the TLB 30. Once the physical tag has been produced by the TLB 30 this is compared with the four tags selected from the cache tag directory by the index. When a match is found then this is used to access the data from the cache 50.

This is faster than the data access shown in FIG. 2. However, tags can be relatively long pieces of data, for example a memory system which has a 32 K 4-way set-associative cache structure (consisting of 64 byte cache line size), would have tags of 19 bits (for a processor with 32-bit addresses). Thus, the comparison stage can be slow.

Furthermore, this process requires the accessing of multiple RAMs i.e. multiple cache tag directories and cache data arrays (RAMs) are accessed during the procedure and power consumption is therefore high.

SUMMARY OF THE INVENTION

Viewed from one aspect the present invention provides a data processor operable to process data, said data processor comprising: a cache in which a storage location of a data item within said cache is identified by an address, said cache comprising a plurality of storage locations and said data processor comprising a cache directory operable to store an address indicator for each storage location comprising stored data; a hash value generator operable to generate a generated hash value from at least some of said bits of said address said generated hash value having fewer bits than said address; a buffer operable to store a plurality of hash values relating to said plurality of storage locations within said cache; wherein in response to a request to access said data item said data processor is operable to compare said generated hash value with at least some of said plurality of hash values stored within said buffer and in response to a match to indicate a storage location of said data item; and said data processor is operable to access one of said address indicators stored within said cache directory corresponding to said indicated storage location and in response to said accessed address indicator not matching said address said data processor is operable to invalidate said indicated storage location within said cache.

Given the amount of time required to manipulate relatively long pieces of data, it is advantageous to produce hashed values of the address having a shorter data length than the address itself but providing a indication of the storage location. A drawback of this is that as the hash values have fewer bits than the address, they may not uniquely identify the storage location of a data item. Thus, in some circumstances accessing a storage location indicated by a match between the hash value generated and a hash value stored in the buffer may result in an incorrect storage location being accessed. In other words, although a hash hit has occurred, it is a false hash hit and the storage location indicated by the hash is not in fact the location where the data item is stored.

In order to avoid the future processing of incorrect data, a check is performed such that an address indicator stored in the cache directory corresponding to the storage location indicated by the hash hit is accessed and an address hit or miss is identified. If a miss is identified, then it is clear that the hash hit was a false hit and the indicated storage location is invalidated. In this way not only is the hash hit verified, but if it is false the probability of future errors is reduced by invalidating the cache line indicated by the hash. Furthermore only one cache directory, that indicated by the hash hit is accessed, this reduces power consumption as only one set of sensing amps need to be enabled.

It should be noted that a data item refers to a piece of data in general and can be an instruction.

In some embodiments, said data processor is operable in response to said accessed address indicator not indicating said address to clean said indicated storage location within said cache as well as invalidating it.

By cleaning what is implied is that the data written from that storage location is written back to memory. This is important in cases where the data in that line has been updated since it was read from memory and thus, the value stored in memory at present is stale and needs to be updated. Thus, in these cases, the processor cleans as well as invalidating the storage location, while in others where the data is not stale only invalidation is performed.

In some embodiments said data processor is further operable to retrieve said data item from memory and to write said data item to said indicated storage location.

In order to avoid future hash hits for this address accessing the wrong storage location, the data item indicated by the address can be written to the indicated storage location so that in future data accesses to this address, the hash value generated from the address will produce a valid hash hit and the correct data item will be accessed.

In some embodiments said data processor is operable to access at least one further address indicator stored within said cache directory and in response to one of said at least one further address indicator indicating said address said data processor is operable to write said generated hash value to a location within said hash buffer corresponding to said storage location indicated by said one of said at least one further address indicators and to invalidate a location within said hash buffer corresponding to said indicated storage location.

In some cases, it may be that there is a hash hit and an address miss corresponding to that actual location indicated by the hash hit, but access to further address indicators reveals that there is an address hit in another location. This is a worse case than where the data is not in the cache at all and needs to be written in from memory, as in this case the data is in the cache but is not in the location indicated by the hash hit. Thus, in order for this to be corrected efficiently and future misses avoided or at least reduced, the hash buffer is revised. The data itself does not have to be rewritten as it is at present in the cache, but the hash buffer should be revised so that a hash of this address gives the correct location in the future.

In one embodiment, said data processor is operable in response to none of said at least one further accessed address indicators corresponding to said address to write said data item to said indicated storage location.

In the case where upon checking further address indicator it is discovered that the data item is not present in the cache then this is a case of a hash hit, physical address miss, and the data item needs to be written from the memory to the cache.

In order to avoid the hash value giving a false indication of storage location in the future it has been found to be advantageous for the data processor to write the data item to the storage location indicated by the hash value.

In one embodiment, said cache is divided into a plurality of cache ways, each cache way comprising a plurality of cache sets; said address comprising a tag portion and an index portion, said index portion indicating one of said plurality of cache sets that said data item is stored in and said tag portion being indicative of one of said plurality of cache ways; said at least some bits of said address used to generate said hash value comprise bits from said tag portion, said hash value having fewer bits than said tag portion; and said at least one further address indicator accessed comprise at least one address indicator stored in at least one location within said cache directory corresponding to said cache set indicated by said index portion of said address.

A common and convenient way of configuring a cache is to have an associative cache divided into a plurality of cache ways. When accessing such a cache it has been found advantageous to produce the hash value from the tag portion of the address. In such a case, when checking that the hash hit is indeed a true hit, the cache directory corresponding to the cache set indicated by the index portion of the address should be accessed. This enables not only the hash hit to be checked, but also it also allows a check of whether the data item is present in that cache set but in a different cache way. If this is the case then the buffer needs to be corrected.

In some embodiments, said address is a virtual address, and said cache directory comprises address indicators derived from physical addresses, said processor being operable to convert said virtual address to a physical address prior to comparing said address indicator with said physical address.

The address used in a data access is often a virtual address, wherein a cache directory comprises address indicators derived from physical addresses. The processor therefore needs to convert the virtual address to a physical address prior to comparing the address indicator with the address. This can be done in parallel to the data access performed using a hash buffer. This comparison is not in the critical cache data access path except where it is discovered that the result from the hash comparison is actually false.

In some embodiments, said address is a virtual address and said at least one further address indicator accessed comprises at least one address indicator stored in at least one location within said cache directory corresponding to both said cache set indicated by said index portion of said address and to a further cache set, and in response to one of said at least one further accessed address indicators corresponding to said further cache set indicating said address, said data processor is operable to access data stored in said location within said further cache set indicated by said address indicator and to write data to a corresponding storage location within said cache set indicated by said index portion of said address.

In some caches, a virtual address does not uniquely identify all of the storage locations within that cache. In these cases, an index portion may not be sufficient to uniquely identify each of the cache sets and thus, it may be that one of two lines may be indicated by a particular index value. This is conventional aliasing. In such a case, once the indicated line of the cache directory has been considered, a further line that may also correspond to a value indicated by the index portion is looked at. In this case, if a hit is found on this further line, then this line needs to be invalidated and the data written to the line originally indicated by the hash.

Although in some embodiments, the data processor may comprise a single hash buffer in others it comprises a plurality of hash buffers each of said plurality of hash buffers corresponding to a respective one of said plurality of cache ways.

A further aspect of the present invention provides, a method of processing data comprising the steps of: storing a data item in a storage location within a cache, said storage location being identified by an address, said cache comprising a plurality of storage locations and said cache comprising a cache directory associated with it operable to store an address indicator for each storage location comprising stored data; generating a generated hash value from at least some of said bits of said address said generated hash value having fewer bits than said address; storing a plurality of hash values relating to said plurality of storage locations within said cache in a buffer; in response to a request to access said data item comparing said generated hash value with at least some of said plurality of hash values stored within said buffer and in response to a match indicating an indicated storage location of said data item; and accessing one of said address indicators stored within said cache directory corresponding to said indicated storage location and in response to said accessed address indicator not indicating said address invalidating said indicated storage location within said cache.

A still further aspect of the present invention provides a means for processing data comprising: a means for storing data in which a storage location of a data item within said means for storing data is identified by an address, said means for storing data comprising a plurality of storage locations and said data processor comprising a means for storing data directory operable to store an address indicator for each storage location comprising stored data; a means for generating a hash value operable to generate a generated hash value from at least some of said bits of said address said generated hash value having fewer bits than said address; a data store means operable to store a plurality of hash values relating to said plurality of storage locations within said means for storing data; wherein in response to a request to access said data item said means for processing data is operable to compare said generated hash value with at least some of said plurality of hash values stored within said data store means and in response to a match to indicate a indicated storage location of said data item; and to access one of said address indicators stored within said means for storing data directory corresponding to said indicated storage location and in response to said accessed address indicator not indicating said address said data processor is operable to invalidate said indicated storage location within said means for storing data.

A yet further aspect of the present invention provides a data processor operable to process data, said data processor comprising: a cache in which a storage location of a data item within said cache is identified by an address, said cache comprising a plurality of storage locations and said data processor comprising a cache directory operable to store an address indicator for each storage location comprising stored data; a hash value generator operable to generate a generated hash value from at least some of said bits of said address said generated hash value having fewer bits than said address; a buffer operable to store a plurality of hash values relating to said plurality of storage locations within said cache; wherein in response to a request to access said data item said data processor is operable to compare said generated hash value with at least some of said plurality of hash values stored within said buffer and in response to none of said at least some of said plurality of hash values matching said generated hash value said processor is operable to: initiate a memory access request to access said data item from a memory; and access at least one further address indicator stored within said cache directory and in response to one of said at least one further address indicator indicating said address said data processor is operable to write said generated hash value to a location within said hash buffer corresponding to said storage location indicated by said at least one further address indicator and to cancel said memory access request.

In the case of a hash miss, it may be that it is a false miss and to check if this is the case a further address indicator can be checked. A false hash miss can arise as a result of using hashes which don't fully qualify the line being present (PC alias condition). If this gives a hit then the hash miss was a false miss and the hash buffer can be corrected to avoid a false miss occurring again. It should be noted that a memory access request to retrieve the data item is initiated in response to the hash miss, as in most cases it will be a true miss. Initiating the memory access at this point will reduce the latency of the memory access. If it turns out to be a false miss this request is cancelled.

A further aspect of the present invention provides a method of processing data within a data processor comprising: storing a data item in a storage location within a cache, said storage location being identified by an address, said cache comprising a plurality of storage locations and said data processor comprising a cache directory operable to store an address indicator for each storage location comprising stored data; generating a generated hash value from at least some of said bits of said address said generated hash value having fewer bits than said address; storing a plurality of hash values relating to said plurality of storage locations within said cache in a buffer; in response to a request to access said data item: comparing said generated hash value with at least some of said plurality of hash values stored within said buffer and in response to none of said at least some of said plurality of hash values matching said generated hash value; initiating a memory access request to access said data item from a memory; and
accessing at least one further address indicator stored within said cache directory and in response to one of said at least one further address indicator indicating said address, writing said generated hash value to a location within said hash buffer corresponding to said storage location indicated by said at least one further address indicator and cancelling said memory access request.

A still further aspect of the present invention provides, a means for processing data comprising: a means for storing data in which a storage location of a data item within said means for storing data is identified by an address, said means for storing data comprising a plurality of storage locations and said means for processing data comprising a means for storing data directory operable to store an address indicator for each storage location comprising stored data; a means for generating a hash value operable to generate a generated hash value from at least some of said bits of said address said generated hash value having fewer bits than said address; a data store means operable to store a plurality of hash values relating to said plurality of storage locations within said means for storing data; wherein in response to a request to access said data item said means for processing data is operable to compare said generated hash value with at least some of said plurality of hash values stored within said data store means and in response to none of said at least some of said plurality of hash values matching said generated hash value said data processing means is operable to: initiate a memory access request to access said data item from a memory means; and access at least one further address indicator stored within said means for storing data directory and in response to one of said at least one further address indicator indicating said address said means for processing data is operable to write said generated hash value to a location within said hash data store means corresponding to said storage location indicated by said at least one further address indicator and to cancel said memory access request.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
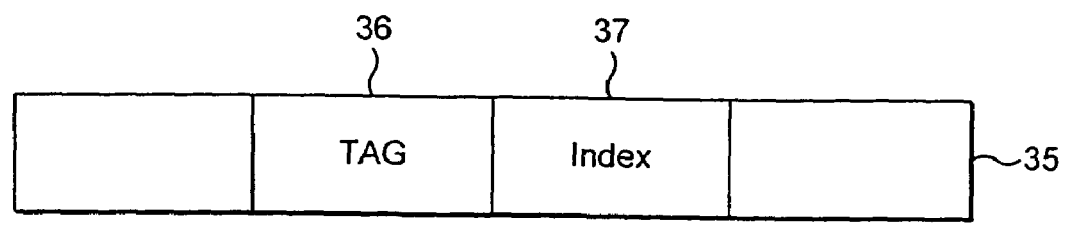
FIG. 1 schematically illustrates a 4-way set associative cache according to the prior art.
Figure 1:
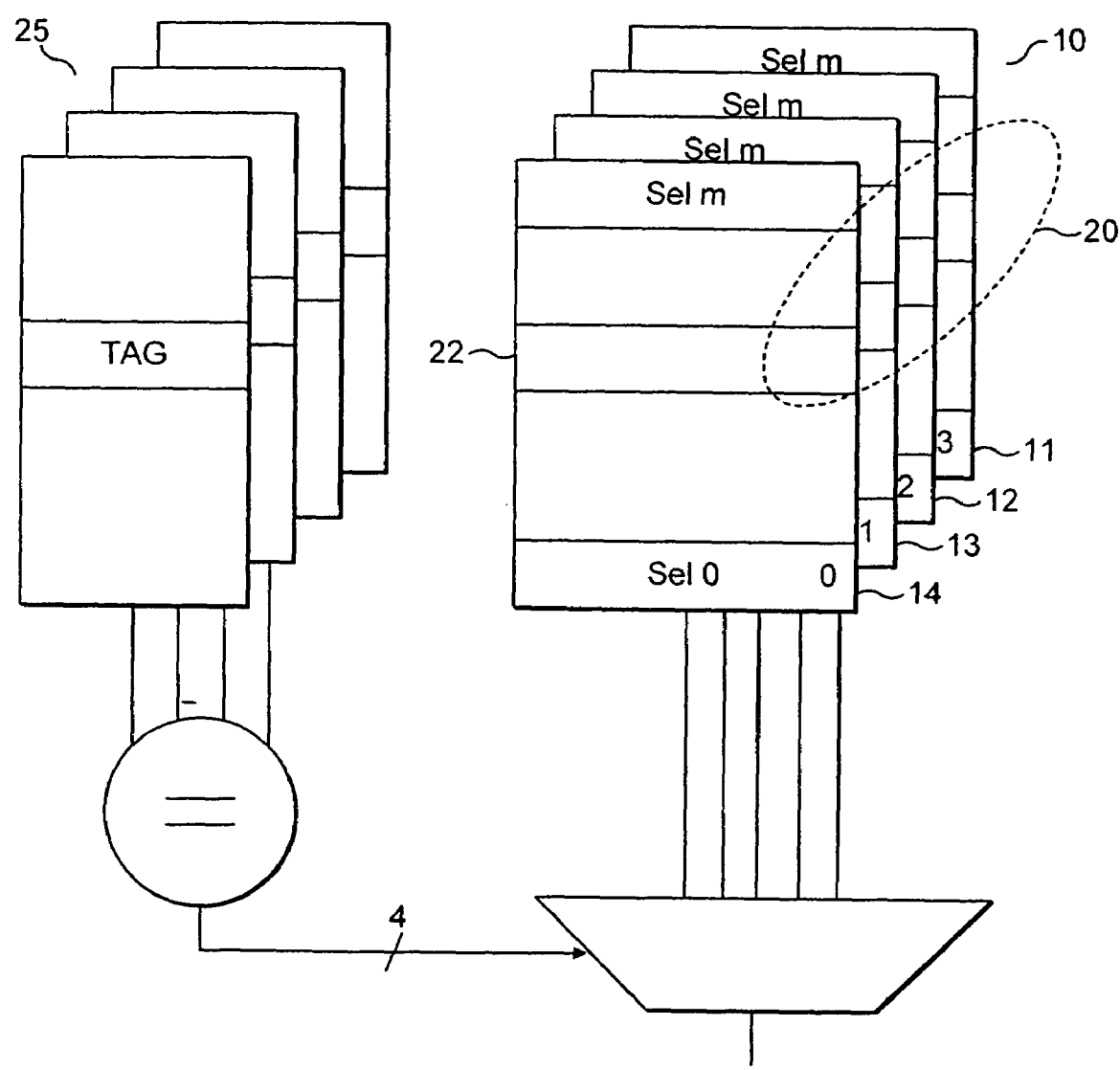
Figure 2:
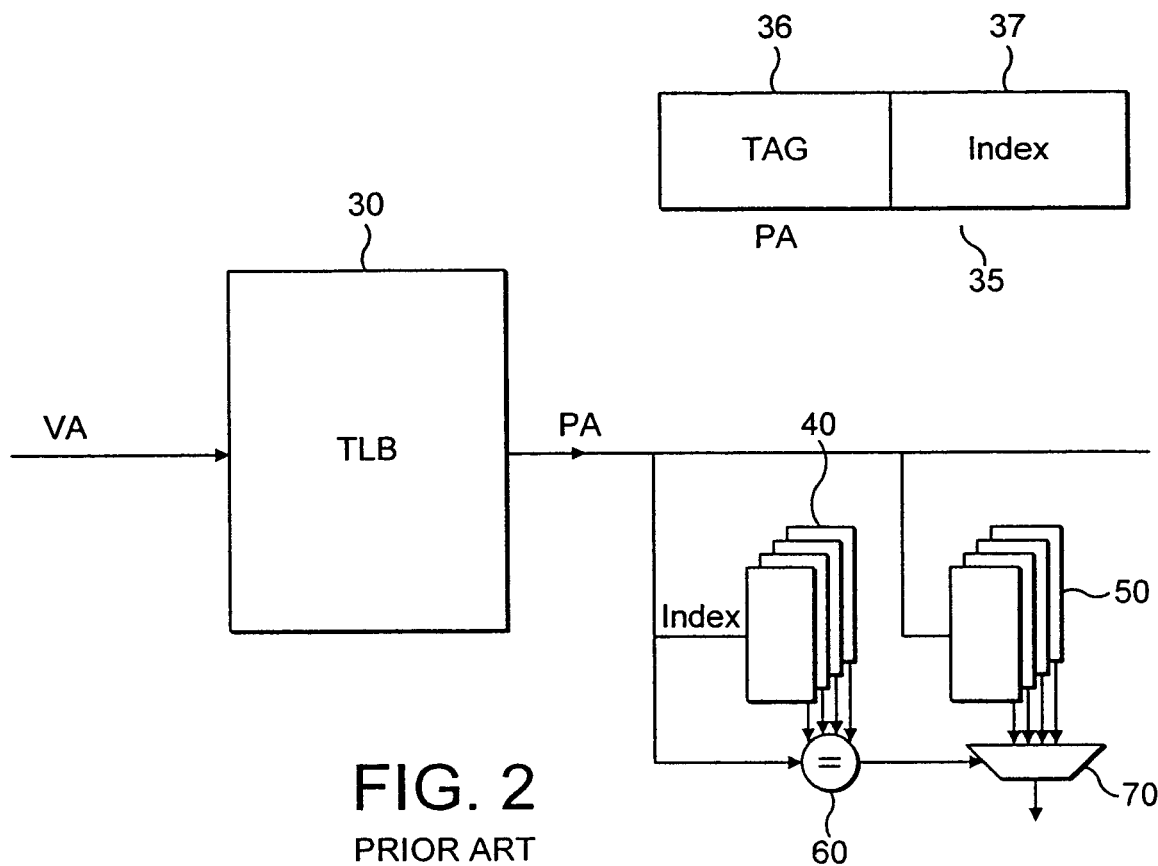
FIG. 2 schematically illustrates data access in a physically indexed/physically tagged cache system according to the prior art.
Figure 3:
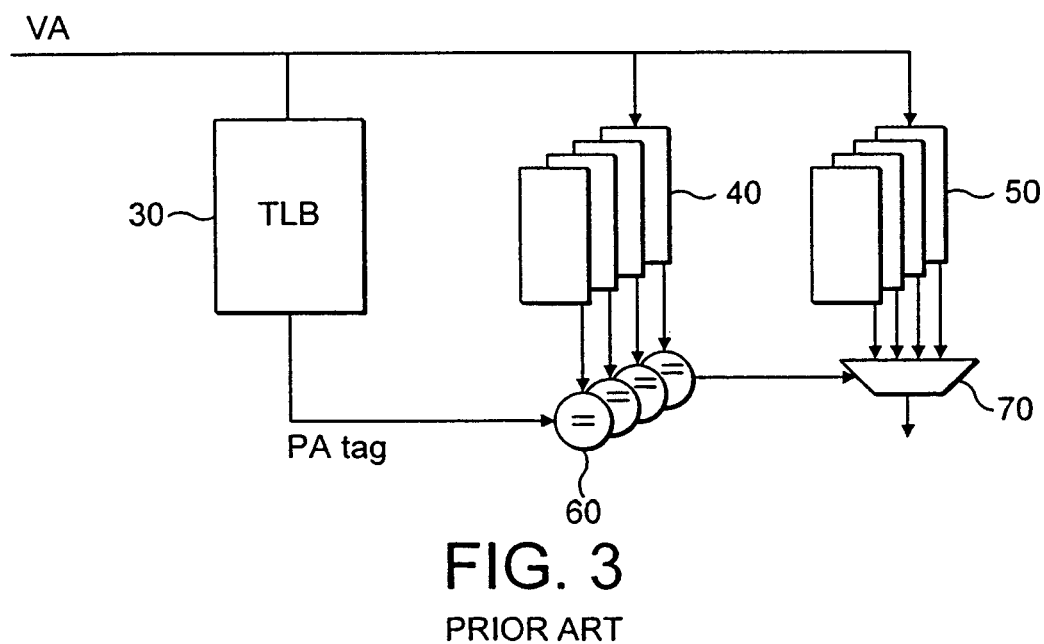
FIG. 3 illustrates data access in a virtually indexed/physically tagged cache system according to the prior art.
Figure 4:
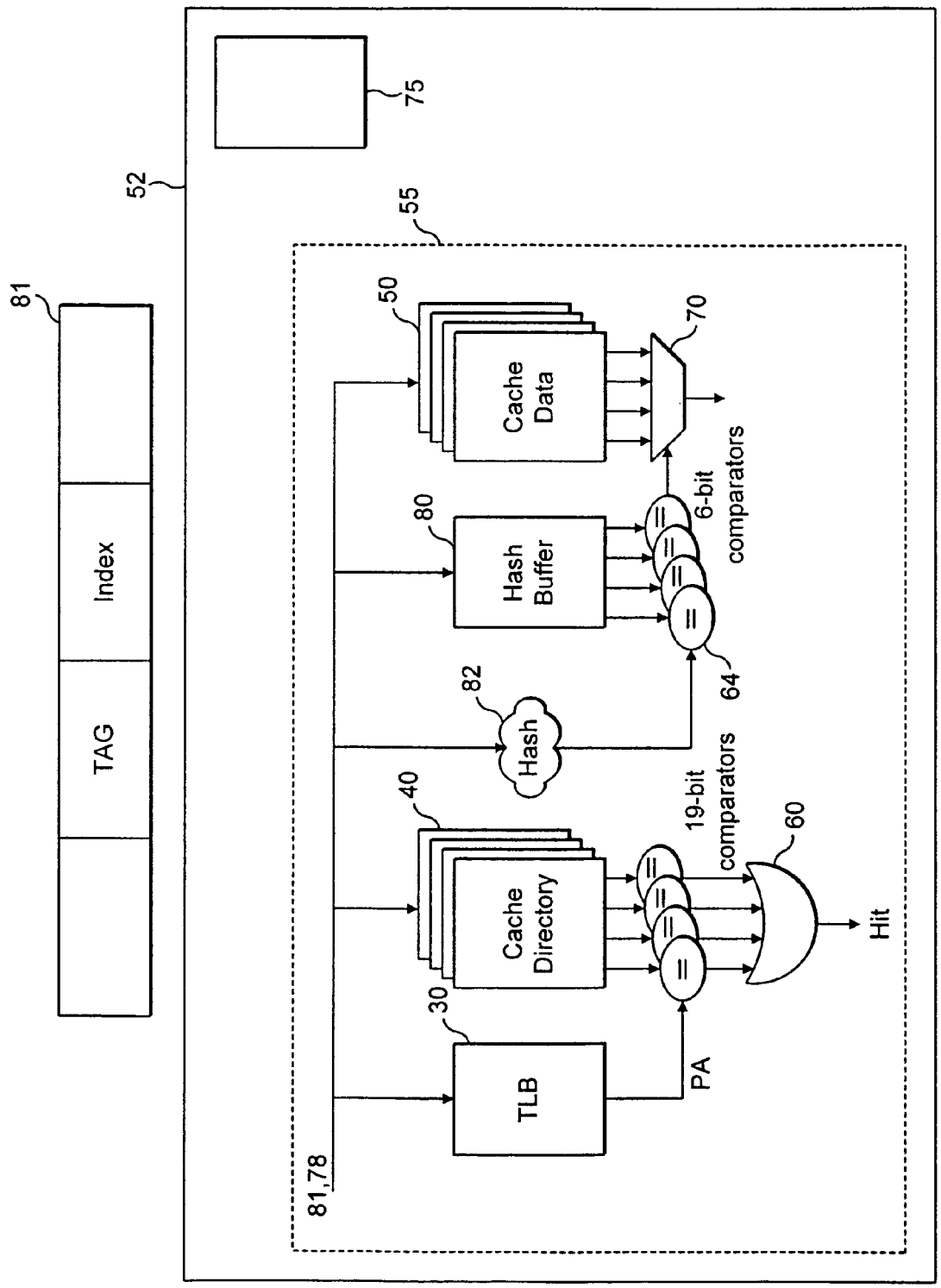
FIG. 4 illustrates data access of a 4-way set associative cache according to an embodiment.

FIG. 4 shows a way of accessing data in a four way set associative cache 50 within data processor 52 according to an embodiment. A virtual address 81 along with an application or process identifier (ASID/PID) 78 identifying the application or process currently being performed by the data processor is sent to the cache access circuits. The ASID/PID is accessed from a register 75 within the data processor 52 where it is stored. The tag portion of the virtual address 81 along with information from the ASID/PID is then converted to a hash value by hash generator 82. The tag portion of the virtual address in this embodiment is 19 bits wide and it is converted to a 6 bit wide hash value. This value is then compared with the four hash values stored in hash buffer 80 that are indicated as appropriate by the index portion of the virtual address. The hash values that are generated are 6 bit wide, thus this comparison is performed using six bit comparators 64. If a match occurs then this identifies one of the cache ways in cache 50 and the data item is accessed via multiplexer 70. Thus, rather than having to access four different tag cache directories and perform a 19 bit comparison, a single buffer is accessed and a six bit comparison is performed.

However, as the hash values are not necessarily unique, there is a possibility that the wrong data item has been accessed. Thus, in parallel to this data access a slower and more rigorous identification of the data item storage location is performed. In this case the virtual address 81 is fed to a TLB 30 and the virtual tag portion of the address is converted to a physical tag portion. The virtual index is input to the cache tag directories 40 and the four possible tags may be compared by comparator 60 to the physical tag. A match identifies which of the cache ways the data item is located in. A check can then be made to see if the data access performed in response to the hash value was indeed correct.

It should be noted that although in this embodiment a TLB is still consulted and the tags are compared, this access and comparison is no longer in the cache access path and as such does not slow down the procedure unless a cache miss has occurred. Thus, provided cache misses are rare the procedure is speeded up.

Figure 5:
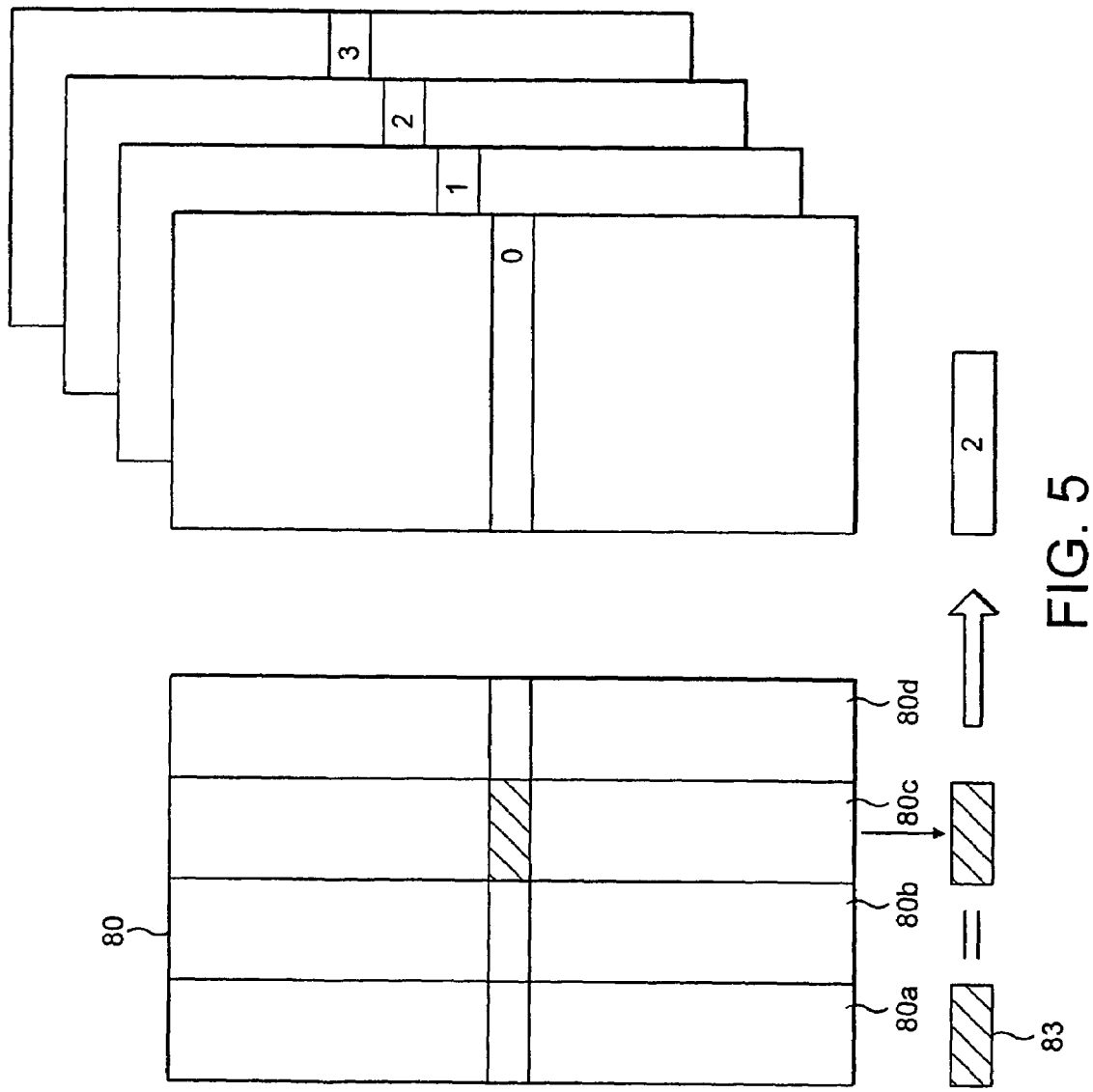
FIG. 5 illustrates the hash value buffer shown in FIG. 4 in more detail.

FIG. 5 shows the hash buffer 80 in greater detail. This hash buffer is arranged in a similar way to the arrangement of data in the cache 50. However, as the hash values are only six bits wide, separate RAMs are not required for each set of hash values corresponding to each way of the cache 50. Thus, the buffer 80 is arranged with hash values corresponding to the same cache line (or cache set) of each way being arranged in a single line. Thus, 80A refers to line 80 of cache way 0 and 80B to line 80 of cache way 1 and so on. When the hash value 83 generated from the virtual address 81 by hash value generator 82 (see FIG. 4) is compared with the hash values in the line indicated by the index portion of the address, it is found, in this case, that the hash value stored in 80C is equal to the hash value 83. This indicates that the cache way 2 of cache 50 (see FIG. 4) is where the data item is stored. By arranging the hash buffer in this way only one RAM need be accessed rather than the traditional four RAMs that need to accessed when the cache tag directories are used to provide an indication of the cache way.

In alternative embodiments (see FIG. 11), the hash values are stored in four hash buffers. The advantage of such an arrangement is that as the hash values are smaller than the traditional tag values, they can be arranged in the hash buffers such that they are easy to access. In the embodiment shown in FIG. 11 they are arranged in each of four ways in two 16×32 bit structures (each hash value being 8 bits in total consisting of 6 bits of hash vale and a secure valid bit and a non-secure valid bit). The 16 rows are indexed by 11:8 bits and bit 12 is used to select between the two 16×32 structures. Bits 7:6 are then used to select the appropriate hash which is then compared with the hash from the virtual address. Thus, although four hash buffers need to be accessed, a comparison of fewer bits is performed during the accesses thus, the four hash buffers can be accessed in less time and with lower power than the traditional cache tag directories.

In embodiments where there is a single hash buffer, the accessing of only one buffer can save power and time. Furthermore, in all embodiments the comparison of the smaller 6 bit hash values rather than the larger 19 bit tags provides both a time and power saving. However, the cache directories 40 are accessed in parallel to provide a check that the hash value provides the correct data item. Although, this does not increase the time of the cache access (unless there is a cache miss) it does mean that the potential reduction in power may not occur. However, as this cache directory access is not in the critical path it is possible to delay it by a cycle and then when the hash value 82 has produced a match with the hash buffer, the way indicated by the match can be used so that only access to the cache tag directory 40 relating to this way is made. By doing this significant power savings can be made.

Figure 6:
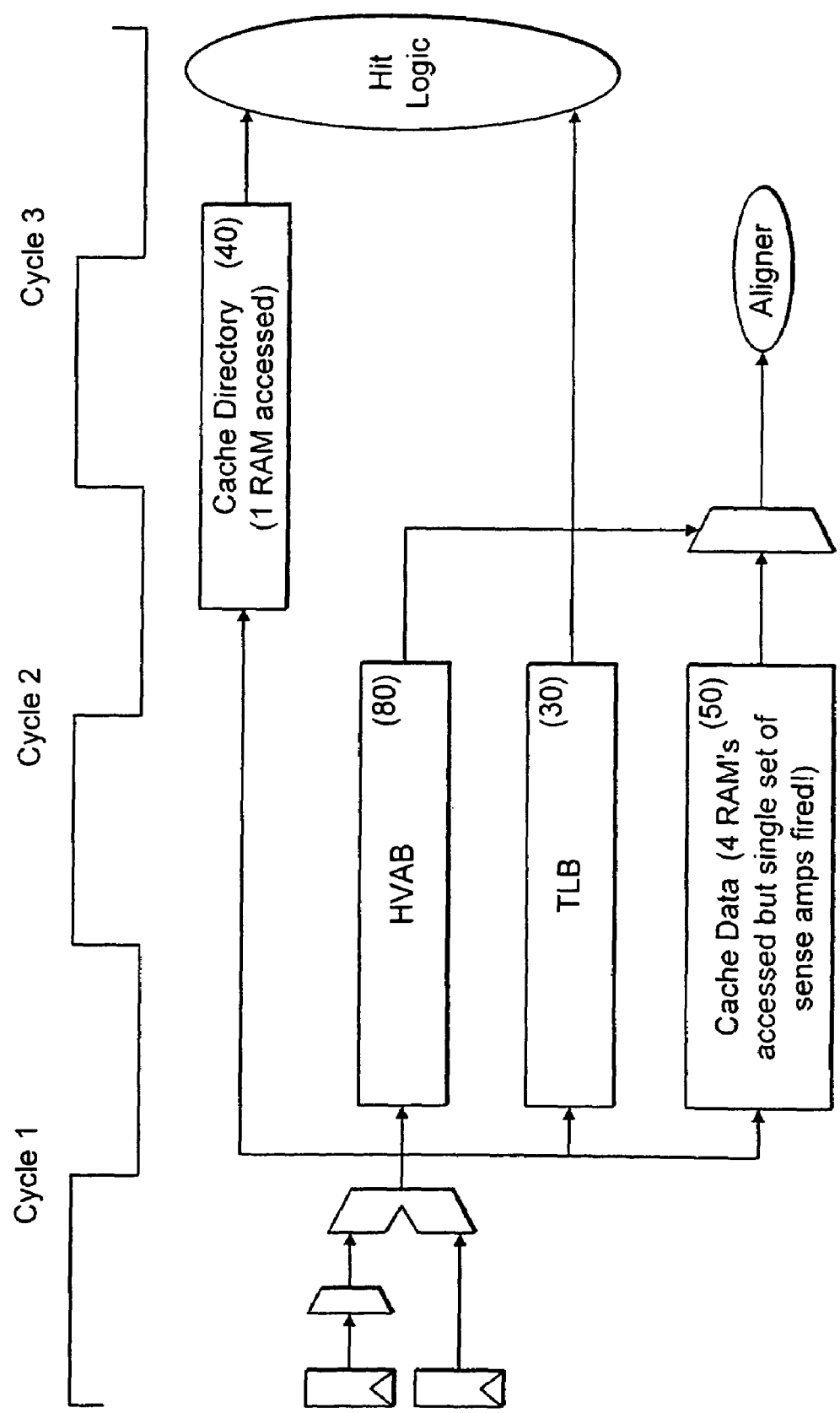
FIG. 6 shows timing of a data access of a 4-way set associative cache according to an embodiment.

The timing of the accesses is shown in FIG. 6. As can be seen from this figure, the access to the cache directory is pushed back until the access to the hash buffer (HVAB) 80 has indicated which RAM of the cache tag directory needs to be accessed. A further power saving can be produced if the information from the hash match is used to power down the sensing amplifiers of the cache data RAMs corresponding to the cache ways that the data is not to be found in. Thus only one set of sensing amplifiers need to be enabled.

The following table, table 1, compares the number of RAM accesses of the traditional access system compared to the access system of embodiments in cases where a hit and miss occur. As can be seen in the traditional method the four data RAMs of the cache 50 need to be accessed and the four tag RAMs of cache directory 40 need to be accessed in each case. In this embodiment only one of the RAMs of the cache directory needs to be accessed in the case of a cache hit and although all four of the cache data RAMs of the cache 50 are accessed initially only one bank of the sense amplifiers are enabled, the others being turned off in response to the hash value showing that they are not needed. In the case of a cache miss, such that the comparison of the physical tag with the indicated way of the cache tag directory does not give a corresponding hit, then all four of the cache tag directories need to be accessed to determine where the data item is.

| Implementation | Data RAM Accesses | Tag RAM Accesses | HVAB Hit/Miss | Total |
|---|---|---|---|---|
| Traditional | 4 | 4 | Hit | 8 |
| Traditional | 4 | 4 | Miss | 8 |
| With hash buffer | 4 (however only 1 bank of sense amps) | 1 | Hit | 5 (but only 2 banks of sense amps) |
| With hash buffer | 4 (no sense amps enabled) | 4 (need to access to determine hash alias conditions) | Miss | 8 (but only sense amps for tag enabled) |

In summary by decoupling the TLB/Cache directory path from the data selection path cache access can be speeded up. Furthermore, removing this from the critical path also enables the cache tag directory access to be pushed out further allowing only one cache tag directory RAM to be accessed.

Figure 7:
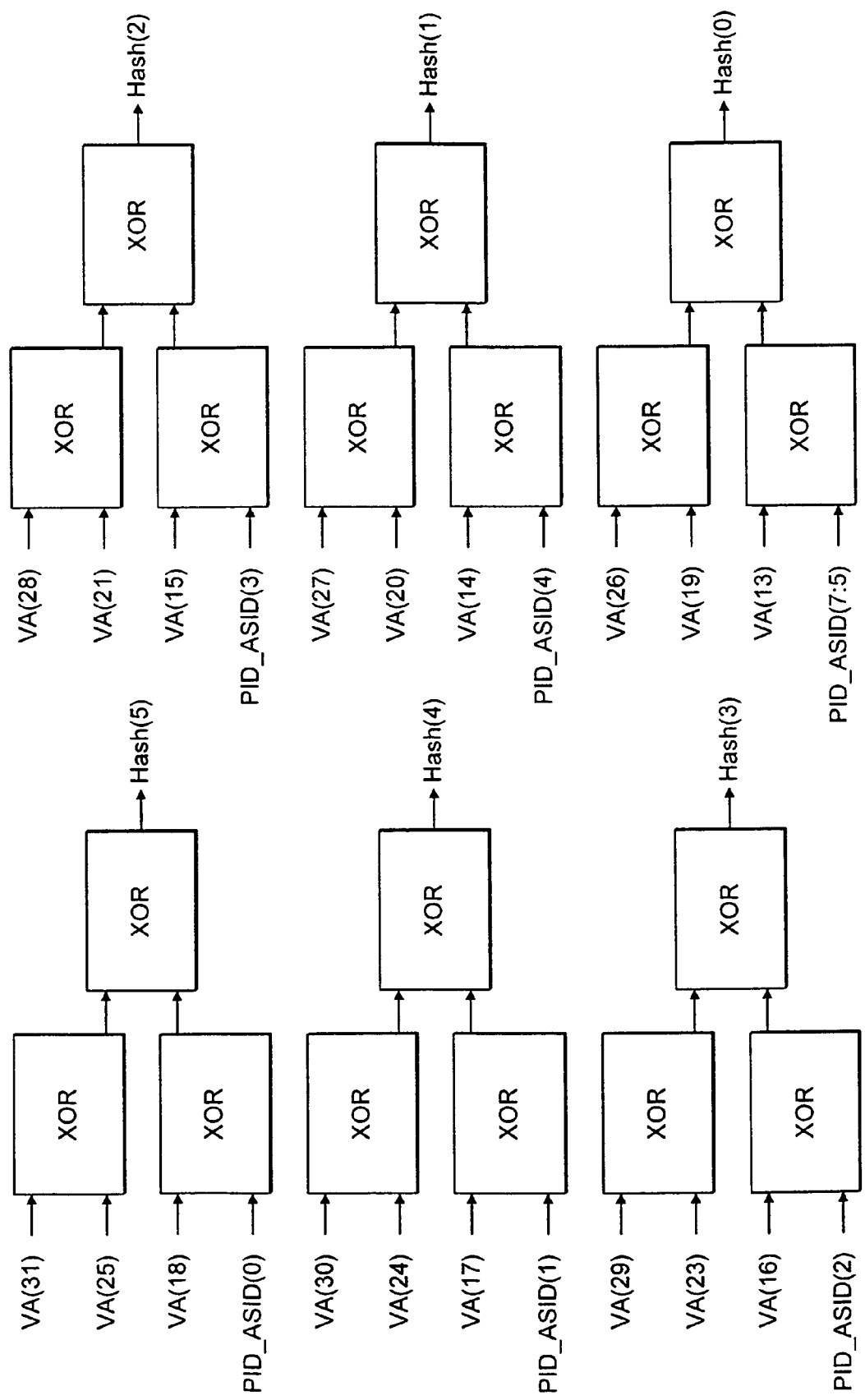
FIG. 7 shows a circuit for generating a hash value.

The use of a hash value and a hash value buffer can therefore improve data access times and reduce power consumption in cases where cache hit occurs. It should be noted that the hash value only provides a hint as to the data storage location and in the cases where a cache miss occurs the resulting process is worse than if the hash buffer was not there. It is therefore very important that the number of cache misses are kept low. The number of cache misses occurring depends on the type of logic operations that are performed and the data that is used to form the hash values. It has been found that using bits of the virtual address and bits of the process identifier or application specific identifier produces an algorithm giving an accurate hint as to the data location in most cases. FIG. 7 shows the implementation of a virtual hash algorithm according to an embodiment. The algorithm uses bits of the tag portion of the virtual address and bits of the application specific identifier or process identifier (ASID/PID). It should be noted that incorporating the ASID/PID enhances the algorithm as processes running with the same set of virtual addresses will produce distinct hash values, which should reduce the number of conflicts and subsequent evictions of data from the cache.

In the algorithm shown each hash bit is generated from virtual address bits that are separated by approximately the number of hash bits produced, in this case six. These bits are exclusive ORed together. For example hash [0] is generated from virtual address bit [13, 19, 26]. This spreads the bits of the virtual address across the bits of the hash value. The algorithm also spreads the ASID/PID bits across each hash bit. However, since the ASID/PID consists of eight bits and the hash value only consists of six bits in this example three of the ASID/PID bits are XORed together and used to generate hash [0]. It should be noted that as the ASID/PID bits are available earlier than any of the virtual address bits, the extra gates to exclusive OR all these together does not slow down the generation of hash [0] compared to the other hash bits.

It has been found in the running of several benchmarks that although the use hash values producing a subset of the tags instead of the entire tags can result in some performance degradation, in fact this has minimal impact on performance and this slight degradation is more that compensated for by the increase in frequency that is achieved by this implementation.

Although it is desirable to reduce the number of caches misses, they will sometimes occur. For example, when using virtual indexes to access caches, a problem of aliasing a virtual address to the same physical address may arise. This occurs in some caches where a virtual index does not uniquely identify all of the storage locations within that cache. In these cases, an index portion may not be sufficient to uniquely identify each of the cache sets and thus, it may be that one of two lines may be indicated by a particular index value. Data integrity is compromised if this is allowed to occur. This is a normal alias condition and is referred to hereinafter as PC/ALIAS condition and may be present in traditional cache systems where the index portion of the address does not comprise sufficient bits to uniquely identify every line within the cache.

Furthermore, in embodiments, a hash buffer has been created to provide an alternative to the cache directory when accessing cache data. The hash buffer contains reduced bit indications of address locations. As mentioned previously, comparing data within this hash buffer requires less power and less time than comparing full length addresses. However, by its very nature of being reduced bit, the hash values do not provide a unique identification of a storage location within a cache and as such further aliasing may occur. The hashes are generated in such a way as to hopefully provide a good indication of storage location within the cache, however, it is always possible that a hash hit will occur which indicates an incorrect data storage location. In order to avoid incorrect data being accessed and used, a check is made of each data access. Provided, most data accesses are correct, this check should not unduly slow down the processor. However, it is important that the check and in particular, the correction of any false cache hits is done efficiently.

With this is mind, each data access is checked using the physical address derived from the virtual address, the TLB 30 and the cache tag directories 40 (see FIG. 4).

Figure 8:
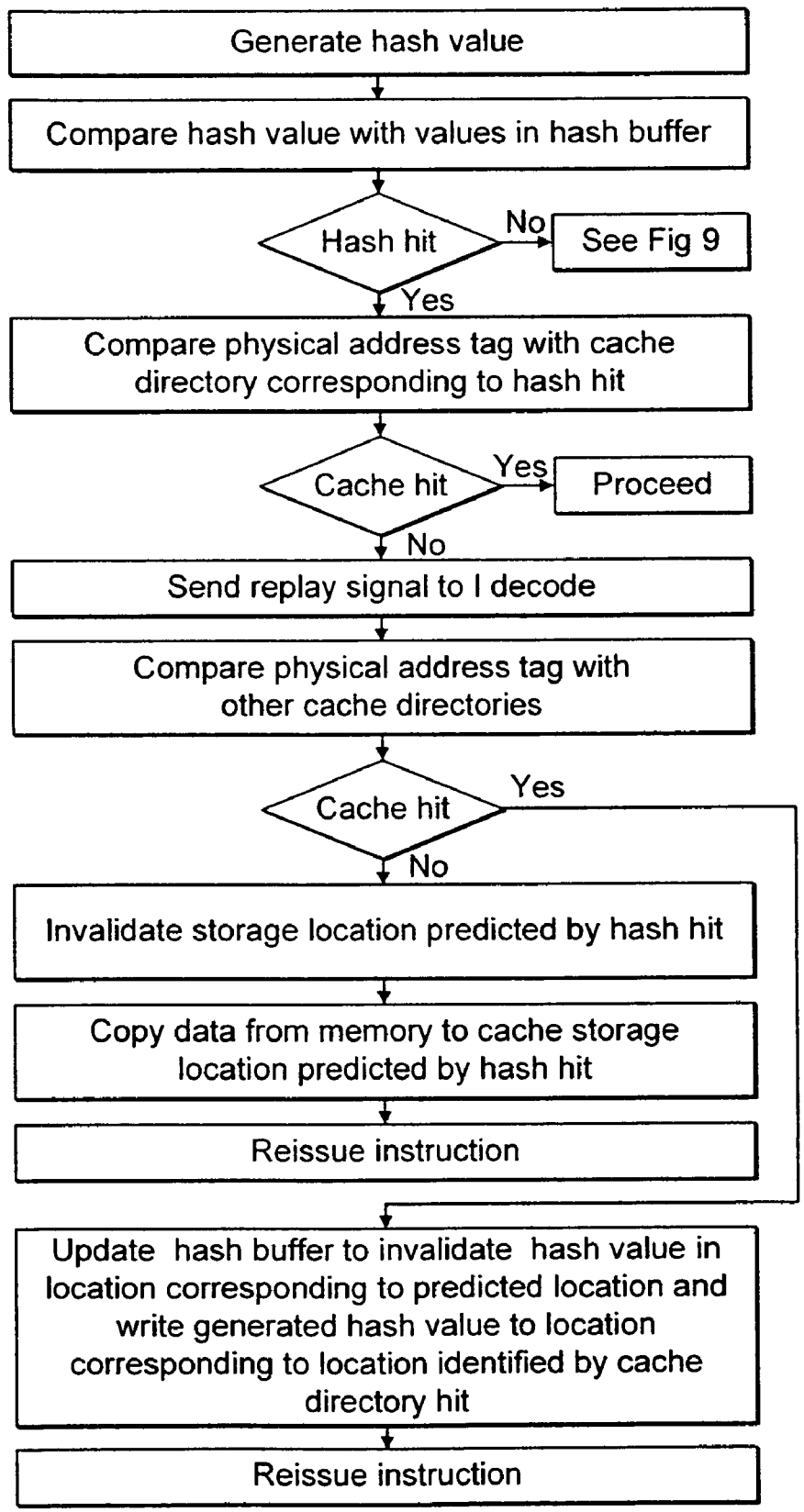
FIG. 8 shows a flow diagram illustrating the steps taken in response to a hash hit cache miss.

FIG. 8 shows a flow diagram illustrating the steps taken in response to a false hash hit, i.e. a hash hit, cache miss. As can be seen following a hash hit a comparison of the physical address tag and cache directory indicated by the hash hit is made. If a cache hit is found, then the hash hit was correct and the processor can continue as normal. If there is not a cache hit, i.e. the data is not in the storage location indicated by the hash buffer 80, an error has occurred, an incorrect data item has been accessed and the processor needs to correct the mistake. Thus, a "replay" signal will be sent to the Idecode unit. This will flush the pipeline and the instruction that generated the stall will be in a position to be re-issued. Prior to re-issuing the instruction some adjustments need to be made to overcome the error.

In order to do this, the rest of the physical address tags within the line of the cache directory indicated by the virtual address are checked. If a cache hit is not found, then it is concluded that the data is not present in the cache, i.e. there is a hash hit/cache miss and the data needs to be written from memory to the cache. Thus, the storage location indicated by the hash hit is invalidated, or in some cases cleaned and invalidated and then data is retrieved from the memory and written to the storage location indicated by the hash hit. By writing the data to the storage location indicated by the hash hit, a hash value generated from this virtual address in the future should give a correct indication of the storage location. The instruction that caused the replay can then be reissued.

In the case that there is a cache hit, i.e. a physical address match is found in the line of the cache directory indicated by the address, but in a different cache way to that indicated by the hash, the hash buffer itself needs to be amended to avoid having two identical hashes within the same line of the hash buffer. Thus, in such a case as this the hash value within the hash buffer corresponding to the originally indicated storage location is invalidated (and the line potentially evicted if dirty) and the generated hash value is written to the storage location corresponding to the physical address hit. Thus, the hash buffer is repaired and future data accesses to this address should not encounter a false hash hit. The instruction that caused the stall can then be reissued.

Figure 9:
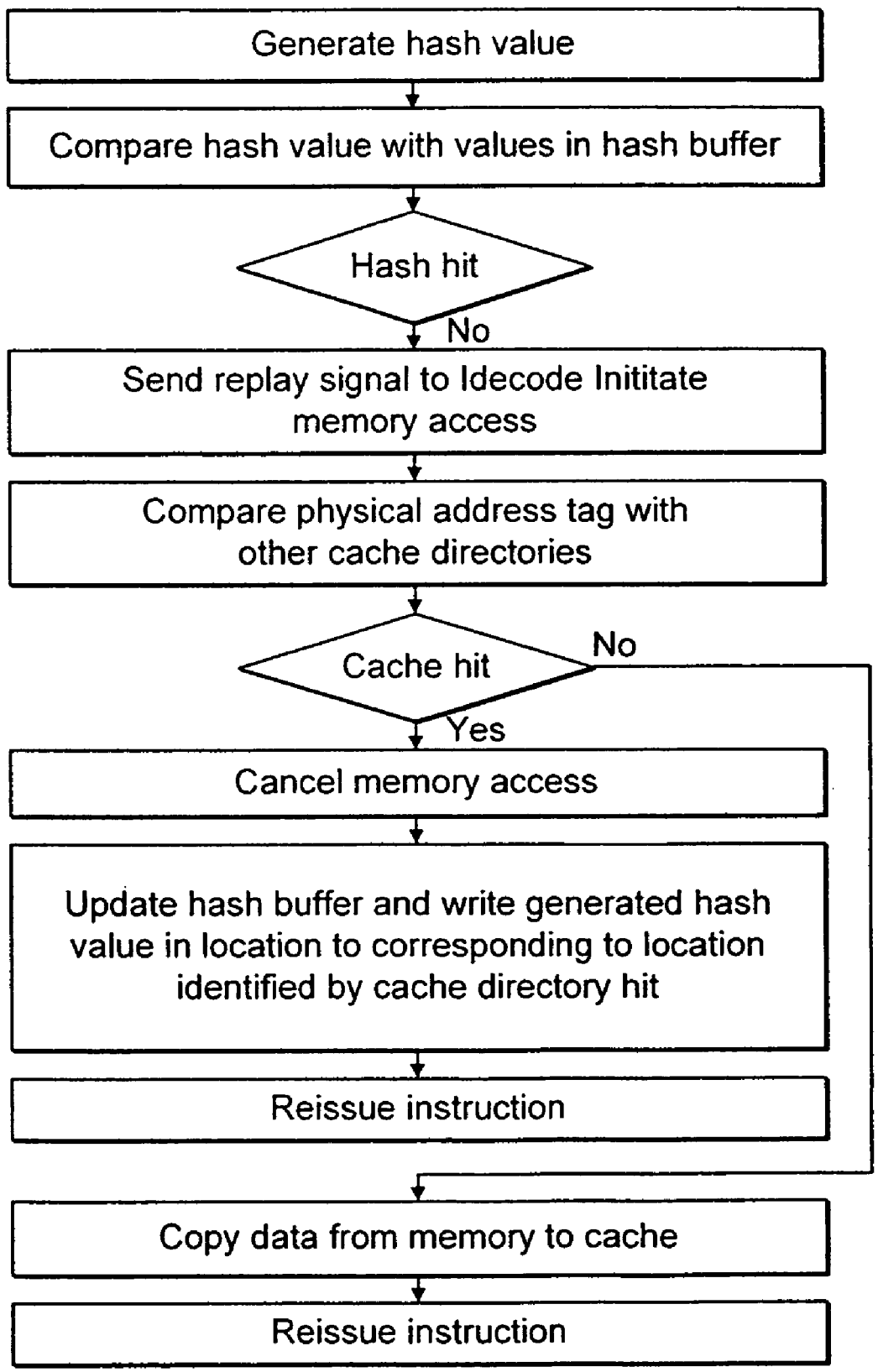
FIG. 9 shows a flow diagram illustrating the steps taken in response to a hash miss.
Figure 10:
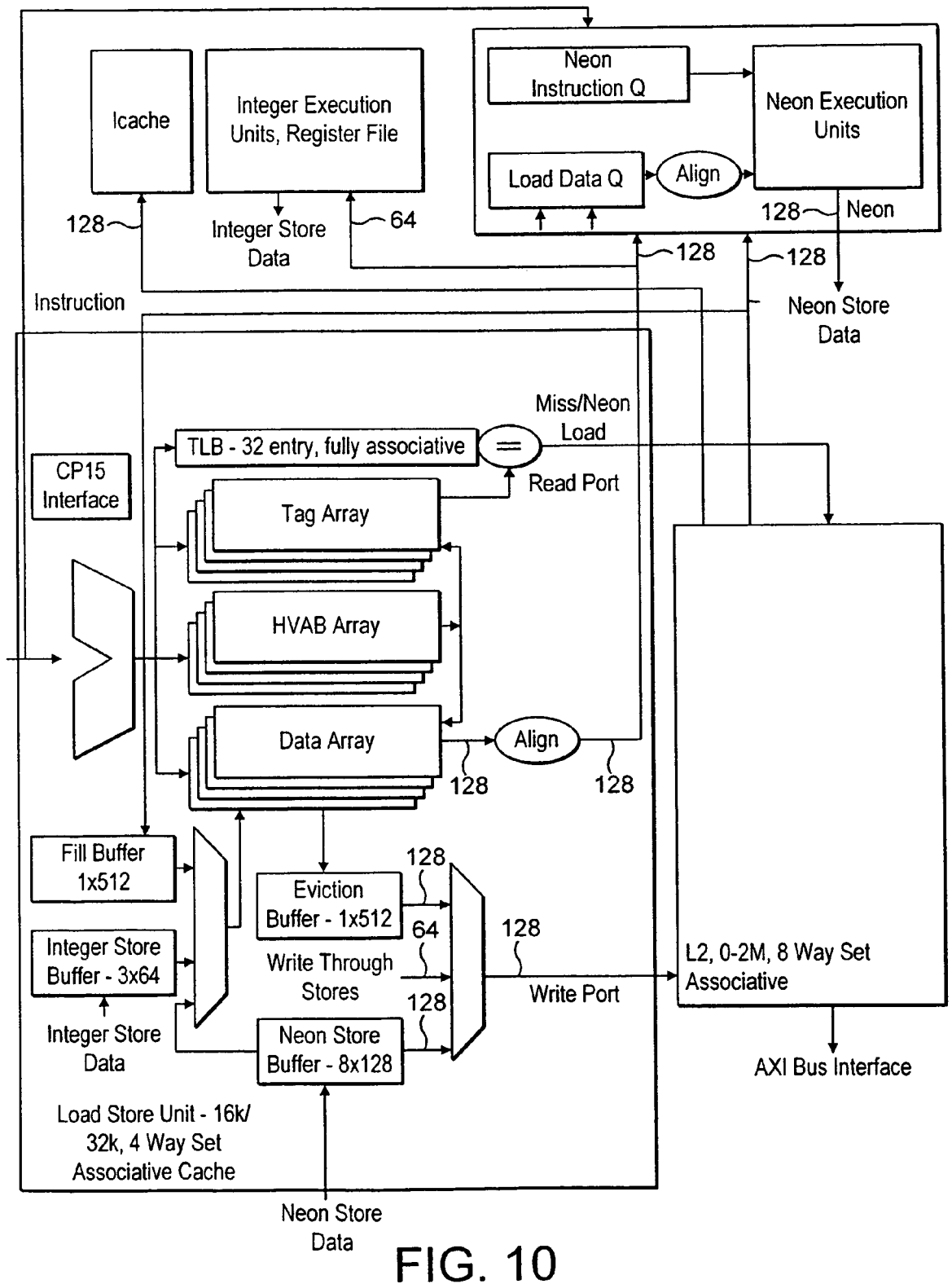
FIG. 10 shows a top level block diagram for a load store unit.

FIG. 9 shows a flow diagram illustrating the steps taken in response to a hash miss. In the case of a hash miss, a replay signal is sent to Idecode and a memory access is initiated. It is important to initiate the memory access at once as the memory access is a long process and this therefore reduces the memory access latency. The physical address tag is then compared to those stored in the cache directories corresponding to the line indicated by the index of the address and if there is no cache hit, then it was a true miss, i.e. hash miss, physical address miss and the memory should be accessed and data written to the cache. The hash buffer also needs to be updated and the generated hash value should be written to the location corresponding to the location to which the data from the memory was written. The instruction can then be reissued.

If there is a cache hit, then the hash miss was a false miss and the memory access can be cancelled. The hash buffer then needs to be updated and the generated hash value should be written to the location corresponding to the location identified by the cache directory hit. This ensures that next time that data should be accessed there will be a hash hit. The instruction can then be reissued.

A further preferred embodiment is described below:

In a traditional physically tagged way associative data cache, the tag array and data array will have to be fired in parallel with the TLB lookup. Once the TLB generates the physical address, it gets compared with the tag array physical tags which then generate the way hit signal to select the appropriate data array way. There are couple of problems with this approach.

All the data ways have to be fired in parallel which is a lot of power. A system using an embodiment of this invention, hereafter referred to as Tiger will be used in wireless systems where low power consumption (lesser than a watt) is very important. To reduce power, the data array could be fired after the tag array has been fired and tag hits have been determined, but this would make the data cache a slower implementation—longer latency. Going from 2 cycle cache access to a 3 cycle cache access would cause a 5-6% drop in performance. Also, all the way tags have to be fired in parallel.

Secondly, in the traditional implementation, in order to get a fast tag array hit, the TLB has to be made fast which implies that the adder that generates the virtual address has to be fast. Thus, there is a lot of pressure on the adder and TLB implementation.

In the HVAB (hashed virtual address buffer) approach, an array which is smaller than the tag array (in terms of number of bits to be compared) called the HVAB array is looked up first and a hashed virtual address (in Tiger's case 6 bits) is used to compare against this array. Not only is the field to be compared smaller, it also uses virtual address bits rather than physical address bits as is normally used in a traditional design. If there is a hit, only the hitting tag and data way are fired. The physical tag from the tag array is then compared with the TLB's PA to make sure that the hash hit is correct. While the tag validation is going on, the data array that was fired in parallel with the tag array way completes and the data is ready for alignment and forwarding to the various functional units.

The advantages of the HVAB scheme are:

Only one tag way and data way are fired which translates to power savings.

The data way access is independent of the tag array access—tag and data array accesses are de-coupled while retaining the advantage of a fast high performance implementation—as the data array is not waiting for the tag hit to determine which data way has to be fired and it is low power as only one way is fired as opposed to all the 4 ways being fired as in a traditional cache design.

The pressure on TLB and adder is greatly alleviated as now, the TLB doesn't have to provide the physical address (PA) quickly to determine tag array hit and data way access. Instead the PA is just needed for hash validation. To make the TLB access fast in a traditional design, the TLB would have to be fired early which would require the adder to be extremely fast—most probably a dynamic adder and dynamic TLB—which translates to design risk.

If the Hash lookup misses, then all 4 ways of tag are fired (please note that due to virtual aliasing problems—8 ways have to be compared in the tag array—4 ways belonging to VA[12]=1 and 4 ways belonging to VA[12]=0 where VA is virtual address—this is described in more detail in later sections) and compared with the TLB PA just as in a traditional design—however, the cache doesn't signal a hit even if the PA matches—a case of hash alias—the instruction is replayed (pipes flushed to Idecode stage D2) while the hash is updated. The instruction when re-executed will get a hash and PA hit. If the PA also misses, then it is a cache miss and access will be sent to L2. If the hash hits and PA misses, then again instruction is replayed, miss resolved and instruction re-executed. However, in this case, the same way as the hash hit way is replaced as otherwise, the hash array will have multiple ways with the same hash. When the hash hits and PA misses, all the 4 ways of the tag array have to be looked up to see if the line is in another way as the hash hit could have been a false hash hit—alias. Thus the hash hit way will have to be flushed out of cache in addition to updating the hash for the tag way hit—otherwise, you will have two different hashes in two ways pointing to same PA.

Another advantage of HVAB is, way hit information is known early and can be used to determine Store Buffer forwarding for loads/stores and store merging which is another traditional speed path in a cache design where PA is used. This is explained in detail in later.

However, HVAB scheme does suffer from the problem of aliasing due to usage of virtual addresses.

Cache Organisation—HVAB Array

Since the Data cache is 32 K and 4 way set associative, each way represents 8 K which is 2" where n=13 or Virtual Address (VA) 12:0. Since the cache line is 64 bytes or 512 bits, the HVAB array index will be 12:6 or 128 rows×8 bits (6 hash bits+1 Non-Secure Valid bit+1 Secure Valid bit). The 128×8 can be broken down physically to be a 64×16 or 32×32 bits (4 hashes are represented in one row)–32×32 represents one way—there are 4 such arrays for the 4 ways. Each way is then broken down further into a 16×32 structure. Thus there are 8 16×32 structures—2 for each way. The 16 rows are indexed by 11:8, bit 12 is used to select between the two 16×32 structures for a way and then bits 7:6 are used to select the appropriate hash before being compared with the incoming VA Hash. Both the Secure and Non-Secure valid bits cannot be set at the same time—only one bit can be set at a time and they are a copy of the NS bit from TLB. If MMU is disabled, then these bits are set using the processor Secure state bit.

The HVAB array is actually built as a register file and has two ports—one read and one write port. The D bits which were originally in the HVAB array have been moved to the data array—so, any reference to D bits in HVAB array should be ignored.

The contents of HVAB Array are:
Secure Valid bit
Non-Secure Valid bit
6 bit Hash
(total of 8 bits per entry)

In order to resolve virtual aliasing conditions, 4 ways form VA[12]=0 and 4 ways from VA[12]=1 are read out each cycle—the hash compare always takes place for the VA[12] bit that was produced by the adder. So, the 4 bit hash hit signal that is produced always corresponds to the VA[12] bit out of the adder. The valid bits from the opposite VA[12] bit is required in order to validate the 8 tag compares on a hash miss. We wouldn't have needed to do this had there been a 2:1 mux on the HVAB read port—but, since this will be a speed path, 4 extra valid bits need to be read out in case there is a hash miss.

Figure 11:
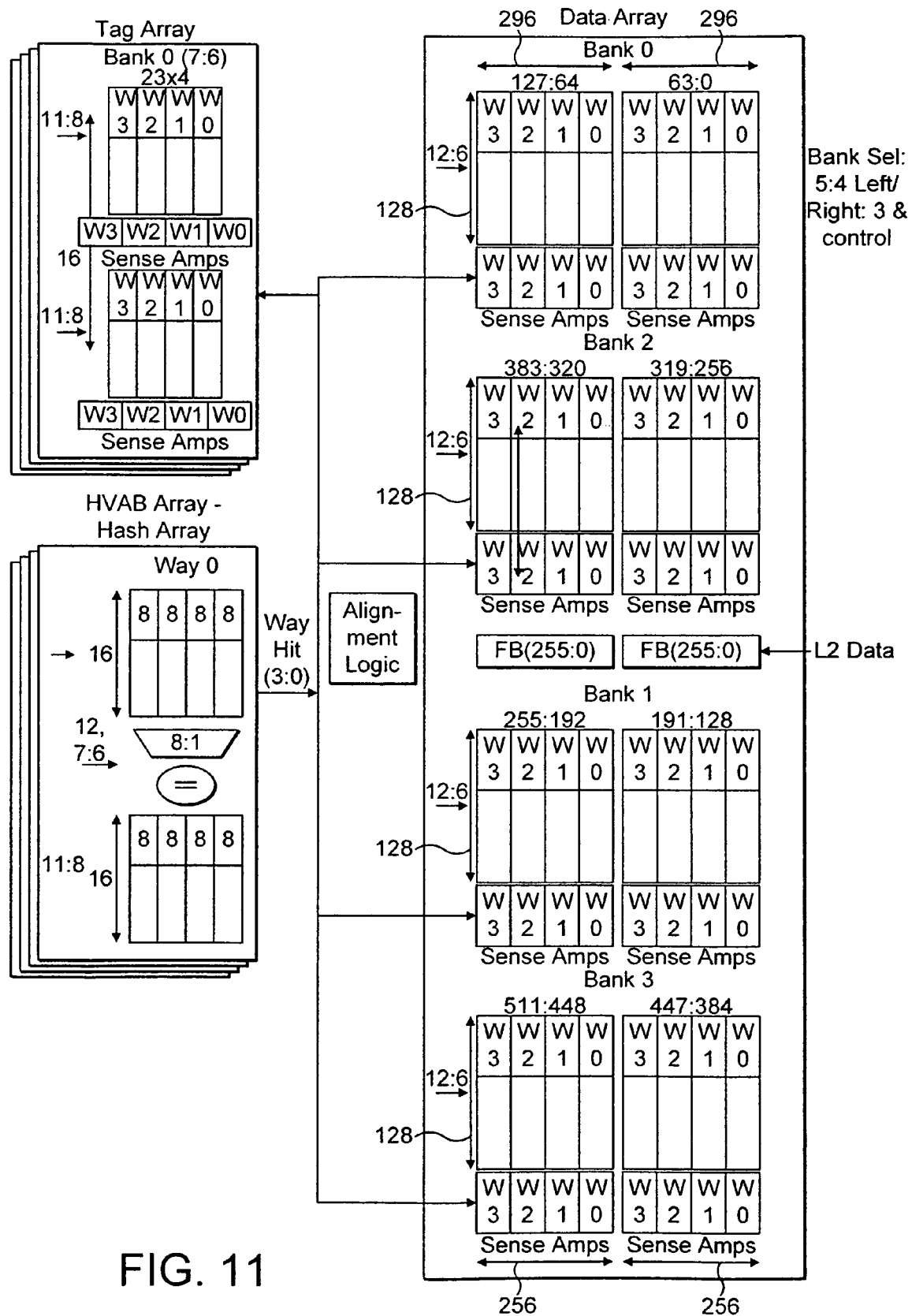
FIG. 11 shows a data cache organization according to an embodiment.

Data cache organisation is shown in FIG. 11.

Valid Bits and Reset of Valid Bits in HVAB Array

There are two bits in the HVAB array to indicate validity of the line—Non-Secure Valid bit and the Secure Valid bit. When Tiger is in Secure mode, Secure valid bit is set to 1 for cache allocations. When Tiger is in Non-Secure mode, Non-Secure Valid bit is set to 1. When we are in Non-Secure mode, the Non-Secure valid bit will be selected and used to validate the hash compare. When we are in Secure mode, the OR of the Secure and Non-Secure valid bits will be used to validate the hash compare—else we will have the same cache line in two different places differing only by Secure/Non-Secure valid bit. Secure mode process can access both Secure and Non-Secure lines.

Resetting of Valid bits for the entire data cache is done out of reset through state machine cycling of all indices or through CP15 cache maintenance operations that can invalidate a single entry.

Replacement Policies on a Cache Miss

A 4 bit random replacement counter is used when all ways are valid. The random replacement counter shifts left by one bit every clock cycle and is sampled on a miss.

Virtual Hash

The virtual hash is formed from VA (31:13) and Process ID (PID)/Address Space ID (ASID). This is formed by a two level XOR. The reason the PID/ASID are being used is to have a good representation of the various processes in the virtual hash. Various hash schemes were studied—5 bit, 6 bits and 7 bits with various levels of XORS. A 6 bit hash has been chosen that gives almost the same hit rate as using the entire physical tag—there was a 1% degradation in hit rate due to aliasing. There can be aliases due to the following reasons:
  virtual hash missing, but PA matching due to not using all the virtual bits in the hash function or different virtual addresses mapping to same PA
  different PID/ASID and different virtual address XOR's producing the same virtual hash.

If timing doesn't work out with two level XOR, then a one level XOR will be used—at present, the hash generation path meets timing. But, during implementation, if this becomes a speed path, then this will be changed to one level XOR hash algorithm.

Page Coloring Problem

As mentioned earlier, the VA(12) and PA(12) cannot be guaranteed to be the same when multiple virtual addresses map to the same physical address—that VA(12)=0 and 1 can map to same PA(12)=0 (or 1). What this means is when VA(12)=0 is used to index into hash and tag arrays and a miss detected, the miss is not a indication of a true miss as the line can be in VA(12)=1 as VA(12)=1 could have brought the line in. Thus we have to look at 8 different places—4 ways at VA(12)=0 and 4 ways at VA(12)=1. Once it is detected to be in VA(12)=1 (or vice versa), the line at VA(12)=1 will be evicted to L2 and brought into VA(12)=0. Of course, we may have to evict a line at VA(12)=0 to make a place for the line being brought into VA(12)=0 from VA(12)=1. This could involve two evictions.

More importantly, a hash miss requires us to look at 8 different places. Now for integer loads, any case other than hash hit, PA hit, replay will be enabled. While we are waiting for L2 data to come back, the 8 ways of the tag array can be looked up to see if the line is present in any of the 8 places. If there is a tag hit, then L2 request is cancelled and the double eviction described above will be take place. If there is no hit, then L2 request is allowed to proceed.

HVAB Array Organization to Solve Virtual Aliasing Conditions

The hash array is already broken down into smaller arrays that can selected by VA(12) bit. However, 8 way compares do not need to be implemented for the following reason. The appropriate VA(12) 4 way hash hit is needed, as only the appropriate way of the 4 ways of the data array corresponding to VA(12) generated by the AGU is accessed rather than accessing 8 ways as is done in tag array. If it is found in the other VA(12), then the line is pushed out to L2. However, since the valid bits are in the Hash array, the valid bits corresponding to the 8 ways are read out for every access—the hash array is actually broken down into smaller sub-arrays of 8 entries—so, twice the number of entries are accessed with respect to organization not supporting hardware Page Coloring. The valid bits are required to validate the 8 way tag compare. The valid bits will be sent to the tag array on a lookup. On a replay, the valid bits will be saved and used to validate the 8 way tag compares—while for a Neon (SIMD processing) Store access, the valid bits will be read out on E2 and used in E3 (see FIG. 12).

Virtual Aliasing Solutions Explored

Following were the various page coloring solutions that were explored:

- Straight forward method of accessing 8 different places—which is the preferred solution as it is simple—though at the expense of more power.
- Wait for the TLB to translate VA(12) and then use it to index tag array—this would have pushed the tag hit/miss determination and replay generation later in E4. Additionally, there was the possibility of holes in the data array—the impact of which cannot be determined very easily.
- 8 way set associative cache—same as straight forward method, but higher power as two data sub-arrays need to get fired.
- Separate duplicate tag array that gets accessed using PA(12) somewhere between L1 and L2 and if there is a hit, replay would be initiated. More area, power and complexity.
- Using L2's Exclusive and Inclusive property—high complexity
- Keeping the cache size 16 K or locking 16 K out when OS that doesn't support s/w page coloring is used Power Improvement for Straight Forward Solution If the L1 cache hit rate is high, then only when we miss and replay for integer loads, do we have to access all the 8 ways.

However since we have to stream Neon and No-Write-Allocate stores, all the 8 ways of the tag array get accessed for every Neon access and integer store access.

The integer store problem can be solved if stores are made write-allocate—however, there is a performance loss when this is done at L1 as it displaces useful information and stores have to be exposed to replay penalty. Since the percentage of stores that miss L1 are probably small, this is probably OK with respect to power.

Neon is the bigger problem as every Neon memory access has to fire up all the 8 tags. One solution being explored is to assume that Neon accesses will be marked Inner Non-Cacheable in TLB and replay if it is marked Cacheable. During the replay, the cache will be inspected to see if the line is resident in L1—if not, the access will be sent to L2. If the line is found to be in L1, then evict the line out to L2. If the OS cannot get the setting of the TLB right, then performance for Neon accesses will be poor.

Also, there can be a mode bit which indicates that an OS supports Software Page Coloring and thus not all the 8 ways needs to be fired—only 4—further reduction in power.

Alias Types

Following are the various kinds of aliases possible:

- Two different virtual addresses mapping to same hash, different physical addresses—hash hit, PA miss—Hash Hit Alias—HH Alias.
- Two virtual address mapping to same physical address—hash miss, PA hit. Replay and update hash—Hash Miss Alias—HM Alias
- Page coloring alias—hash miss, PA hit in one of the 4 ways corresponding to ~VA[12]—hash miss, Alias—PC (Page Coloring) Alias Summary of Hash Array/Tag Array Way Accesses for Various Operations The data array is always looked up using the 4 bit Hash Way hit/miss signal from HVAB array corresponding to the VA[12] bit that was generated by the AGU adder.

Integer Loads

TABLE 2

Hash, Tag array accesses for Integer loads

| Hash Compare | Tag Compare | Tag Compare Result | Integer Load |
|---|---|---|---|
| Hash Hit (HH) | One Way Sensed | PA Hit | Cache Hit |
| Hash Hit | One Way Sensed | PA Miss | Replay, Lookup all 8 ways to detect HH alias and PC alias or True miss<br>HH Alias: Evict HH Way, update hash in one of the other 3 ways<br>PC Alias: Evict1 ~VA[12], Evict2 HH Way, allocate into HH way<br>True Miss: Replace HH Way |
| Hash Miss (HM) | 8 Ways sensed | PA Miss | Replay. True miss. |
| Hash Miss | 8 Ways sensed | Alias | Replay. Alias can be HM or PC alias.<br>HM Alias: Update hash<br>PC Alias: Evict1 ~VA[12], Evict2 VA[12] possible. |

Integer Stores and Neon Accesses

TABLE 3

Hash, Tag Array Accesses for Integer Stores and Neon Accesses

| Hash Compare | Tag Compare | Tag Compare Result | Integer Stores/Neon Accesses |
|---|---|---|---|
| Hash Hit (HH) | One Way Sensed | PA Hit | Cache Hit |
| Hash Hit | One Way Sensed | PA Miss | Replay, Lookup all 8 ways to detect HH alias and PC alias or True miss<br>HH Alias: Evict HH Way, update hash in one of the other 3 ways<br>PC Alias: Evict1 ~VA[12], Evict2 HH Way allocate into HH way<br>True Miss: Don't allocate! Make Integer Store NWA (no write allocate) and Neon L1 non-cacheable (NC). Flush HH way so that future accesses can become HM, PA Miss |

TABLE 3-continued

Hash, Tag Array Accesses for Integer Stores and Neon Accesses

| Hash Compare | Tag Compare | Tag Compare Result | Integer Stores/Neon Accesses |
|---|---|---|---|
| Hash Miss (HM) | 8 Ways sensed | PA Miss | Do Not Replay. Make Integer Store NWA and Neon L1 NC |
| Hash Miss | 8 Ways sensed | Alias | Replay. Alias can be HM or PC alias. HM Alias: Update hash PC Alias: Evict1 ~VA[12] |

Instruction Accesses

Instruction accesses need not worry about PC Alias. The line can co-exist in two different indices—but care has to be taken to invalidate both locations when invalidate operations are performed.

TABLE 4

Instruction Accesses

| Hash Compare | Tag Compare | Tag Compare Result | Integer Load |
|---|---|---|---|
| Hash Hit (HH) | One Way Sensed | PA Hit | Cache Hit |
| Hash Hit | One Way Sensed | PA Miss | Replay, Lookup all 8 ways to detect HH alias and PC alias or True miss HH Alias: Invalidate HH Way, update hash in one of the other 3 ways IF doesn't need to do this: PC Alias: Evict1~VA[12], Evict2 HH Way, allocate into HH way True Miss: Replace HH Way |
| Hash Miss (HM) | 8 Ways sensed | PA Miss | Replay. True miss. |
| Hash Miss | 8 Ways sensed | Alias | Replay. Alias can be HM or PC alias. HM Alias: Update hash IF doesn't need to do this: PC Alias: Evict1~VA[12], Evict2 VA[12] possible |

Cache Pipelines

Figure 12:
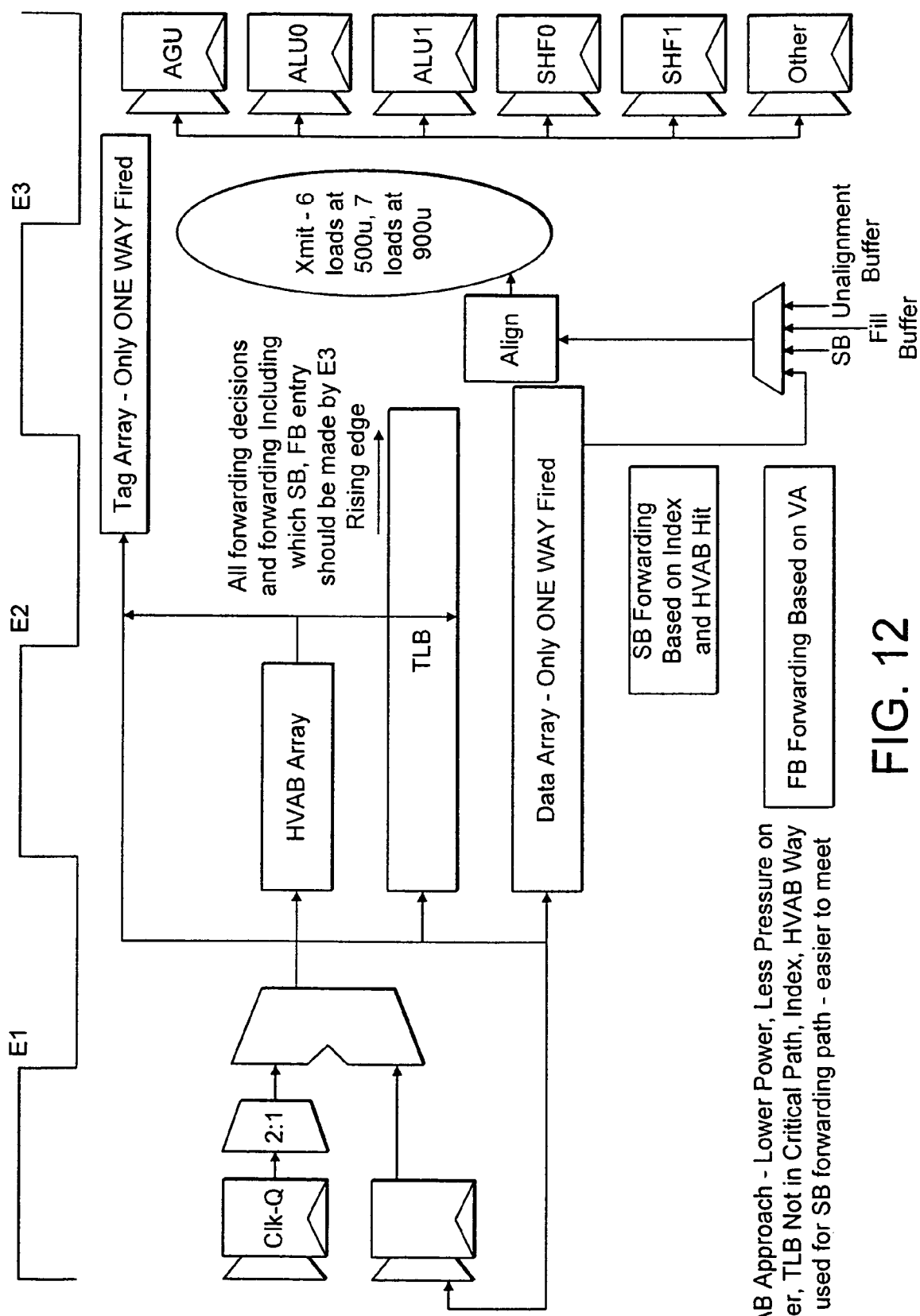
FIG. 12 shows a simple cache pipeline.

A simplified pipeline is shown in FIG. 12.

The memory pipeline is comprised of three stages:
Address Generation Cycle (E1)—two way add/subtract with optimization for shift by 0 or 2. Shifts greater than 2 will take two operations—one exclusively for shifting and one for address generation. Address decoding for HVAB and Data array takes place.
Data Cache Cycle 1 (E2)—the HVAB arrays are accessed, HVAB hit signals then start the data array access, TLB is accessed, ISB and NSB are compared for matches as is the Fill Buffer (FB). Tag array addresses are decoded.
Data Cache Cycle 2 (E3)—Data from data array is muxed with data from FB, ISB, aligned and forwarded to various functional units. The tag array is accessed and physical tag from tag array is compared with TLB PA to validate hash hit from HVAB arrays. Cache miss indication comes very late in E3.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processor operable to process data, said data processor comprising:

a cache in which a storage location of a data item within said cache is identified by an address, said cache comprising a plurality of storage locations and said data processor comprising a cache directory operable to store an address indicator for each storage location comprising stored data;

a hash value generator operable to generate a generated hash value from at least some of said bits of said address said generated hash value having fewer bits than said address;

a buffer operable to store a plurality of hash values relating to said plurality of storage locations within said cache; wherein in response to a request to access said data item said data processor is operable to compare said generated hash value with at least some of said plurality of hash values stored within said buffer and in response to a match to indicate a indicated storage location of said data item; and said data processor is operable to access one of said address indicators stored within said cache directory corresponding to said indicated storage location and in response to said accessed address indicator not matching said address said data processor is operable to invalidate said indicated storage location within said cache, wherein said data processor is operable to access at least one further address indicator stored within said cache directory and in response to one of said at least one further address indicator indicating said address said data processor is operable to write said generated hash value to a location within said hash buffer corresponding to said storage location indicated by said one of said at least one further address indicators and to invalidate a location within said hash buffer corresponding to said indicated storage location.

2. A data processor according to claim 1, wherein said data processor is operable in response to none of said at least one further accessed address indicators corresponding to said address to write said data item to said indicated storage location.

3. A data processor according to claim 1, wherein:
said cache is divided into a plurality of cache ways, each cache way comprising a plurality of cache sets;
said address comprising a tag portion and an index portion, said index portion indicating one of said plurality of cache sets that said data item is stored in and said tag portion being indicative of one of said plurality of cache ways;
said at least some bits of said address used to generate said hash value comprise bits from said tag portion, said hash value having fewer bits than said tag portion; and
said at least one further address indicators accessed comprise address indicators stored in locations within said cache directory corresponding to said cache set indicated by said index portion of said address.

4. A data processor according to claim 3, wherein said address is a virtual address and said at least one further address indicator accessed comprises at least one address indicator stored in at least one location within said cache directory corresponding to both said cache set indicated by said index portion of said address and to a further cache set, and in response to one of said at least one further accessed address indicators corresponding to said further cache set indicating said address, said data processor is operable to access data stored in said location within said further cache set indicated by said address indicator and to write data to a corresponding storage location within said cache set indicated by said index portion of said address.

5. A data processor according to claim 1, said data processor further comprising a plurality of hash buffers each of said plurality of hash buffers corresponding to a respective one of said plurality of cache ways.

6. A data processor operable to process data, said data processor comprising:
a cache in which a storage location of a data item within said cache is identified by an address, said cache comprising a plurality of storage locations and said data processor comprising a cache directory operable to store an address indicator for each storage location comprising stored data;
a hash value generator operable to generate a generated hash value from at least some of said bits of said address said generated hash value having fewer bits than said address;
a buffer operable to store a plurality of hash values relating to said plurality of storage locations within said cache; wherein
in response to a request to access said data item said data processor is operable to compare said generated hash value with at least some of said plurality of hash values stored within said buffer and in response to none of said at least some of said plurality of hash values matching said generated hash value said processor is operable to:
initiate a memory access request to access said data item from a memory; and
access at least one further address indicator stored within said cache directory and in response to one of said at least one further address indicator indicating said address said data processor is operable to write said generated hash value to a location within said hash buffer corresponding to said storage location indicated by said at least one further address indicator and to cancel said memory access request.

7. A data processor according to claim 6, wherein:
said cache is divided into a plurality of cache ways, each cache way comprising a plurality of cache sets;
said address comprising a tag portion and an index portion, said index portion indicating one of said plurality of cache sets that said data item is stored in and said tag portion being indicative of one of said plurality of cache ways;
said at least some bits of said address used to generate said hash value comprise bits from said tag portion, said hash value having fewer bits than said tag portion; and
said at least one further address indicators accessed comprise address indicators stored in locations within said cache directory corresponding to said cache set indicated by said index portion of said address.

8. A data processor according to claim 6, wherein said address is a virtual address, and said cache directory comprises address indicators derived from physical addresses, said processor being operable to convert said virtual address to a physical address prior to comparing said address indicator with said physical address.

9. A data processor according to claim 7, wherein said address is a virtual address and said at least one further address indicator accessed comprises at least one address indicator stored in at least one location within said cache directory corresponding to both said cache set indicated by said index portion of said address and to a further cache set, and in response to one of said at least one further accessed address indicators corresponding to said further cache set indicating said address, said data processor is operable to access data stored in said location within said further cache set indicated by said address indicator and to write data to a corresponding storage location within said cache set indicated by said index portion of said address.

10. A data processor according to claim 7, said data processor further comprising a plurality of hash buffers each of said plurality of hash buffers corresponding to a respective one of said plurality of cache ways.

11. A method of processing data within a data processor comprising:
storing a data item in a storage location within a cache, said storage location being identified by an address, said cache comprising a plurality of storage locations and said data processor comprising a cache directory operable to store an address indicator for each storage location comprising stored data;
generating a generated hash value from at least some of said bits of said address said generated hash value having fewer bits than said address;
storing a plurality of hash values relating to said plurality of storage locations within said cache in a buffer;
in response to a request to access said data item:
comparing said generated hash value with at least some of said plurality of hash values stored within said buffer and in response to none of said at least some of said plurality of hash values matching said generated hash value;
initiating a memory access request to access said data item from a memory; and
accessing at least one further address indicator stored within said cache directory and in response to one of said at least one further address indicator indicating said address, writing said generated hash value to a location within said hash buffer corresponding to said storage location indicated by said at least one further address indicator and cancelling said memory access request.

12. A means for processing data comprising:

a means for storing data in which a storage location of a data item within said means for storing data is identified by an address, said means for storing data comprising a plurality of storage locations and said means for processing data comprising a means for storing data directory operable to store an address indicator for each storage location comprising stored data;

a means for generating a hash value operable to generate a generated hash value from at least some of said bits of said address said generated hash value having fewer bits than said address;

a data store means operable to store a plurality of hash values relating to said plurality of storage locations within said means for storing data; wherein in response to a request to access said data item said means for processing data is operable to compare said generated hash value with at least some of said plurality of hash values stored within said data store means and in response to none of said at least some of said plurality of hash values matching said generated hash value said data processing means is operable to:

initiate a memory access request to access said data item from a memory means; and access at least one further address indicator stored within said means for storing data directory and in response to one of said at least one further address indicator indicating said address said means for processing data is operable to write said generated hash value to a location within said hash data store means corresponding to said storage location indicated by said at least one further address indicator and to cancel said memory access request.

* * * * *